United States Patent [19]

Teach

[11] Patent Number: 5,334,987
[45] Date of Patent: Aug. 2, 1994

[54] AGRICULTURAL AIRCRAFT CONTROL SYSTEM USING THE GLOBAL POSITIONING SYSTEM

[75] Inventor: Ted L. Teach, Dayton, Ohio

[73] Assignee: Spectra-Physics Laserplane, Inc., Dayton, Ohio

[21] Appl. No.: 41,162

[22] Filed: Apr. 1, 1993

[51] Int. Cl.$^5$ .......................... H04B 7/185; G01S 5/02
[52] U.S. Cl. .................................................. 342/357
[58] Field of Search ........................................ 342/357

[56] References Cited

U.S. PATENT DOCUMENTS

| | | |
|---|---|---|
| 4,225,226 | 9/1980 | Davidson et al. ...................... 356/1 |
| 4,234,924 | 11/1980 | LaVance et al. ..................... 364/460 |
| 4,398,195 | 8/1983 | Dano . |
| 4,814,711 | 3/1989 | Olsen et al. .......................... 324/331 |
| 5,175,557 | 12/1992 | King et al. ............................ 342/357 |

OTHER PUBLICATIONS

Navstar GPS User Equipment Guide, Feb. 1991 from GPS Information Center in Alexandria, VA.

Primary Examiner—Theodore M. Blum
Attorney, Agent, or Firm—Killworth, Gottman, Hagan & Schaeff

[57] ABSTRACT

An aircraft control system for applying chemicals to an agricultural field in one of a plurality of flight patterns is provided. A global positioning system receiver receives radio frequency signals from satellites and the position of the aircraft is determined from the information contained in the received signals. An aircraft computer stores the surface coordinates of the field to be sprayed. The aircraft pilot enters the desired orientation, swath width and track width of the flight pattern into the computer. Based on the aforementioned information, the computer produces a flight pattern having the desired orientation and generates, via a pilot headset, audible signals representative of amount and direction of deviation from the desired flight pattern. The computer means may also automatically activate and deactivate chemical spraying upon entering and exiting, respectfully, the airspace above the field.

19 Claims, 3 Drawing Sheets

AGRICULTURAL AIRCRAFT CONTROL SYSTEM USING THE GLOBAL POSITIONING SYSTEM

BACKGROUND OF THE INVENTION

The present invention relates generally to chemical spraying of agricultural fields from an aircraft and, more particularly, to a control system and method for applying chemicals to an agricultural field wherein the chemicals are automatically released over the field as the aircraft travels along an appropriate flight pattern. Radio frequency signals from global positioning satellites are used to determine the instantaneous position of the aircraft relative to the flight pattern and the field.

Chemical spraying of field crops and orchards has long been widespread in the agricultural industry. During aerial spraying of chemicals on an agricultural field, the aircraft makes numerous sequential, adjacent passes, spraying a swath across the field during each pass. The aircraft pilot must carefully guide the aircraft to ensure that each of the successive traverses over the field is laterally spaced from the adjacent traverse by the proper distance in order to avoid either gaps or overlaps in spraying coverage. As will be appreciated, overlaps in spraying coverage result in spraying more chemicals on the field than desired. This is costly and may cause crop damage. Gaps between swaths, on the other hand, leave untreated areas in which crop growth may be poor.

Several methods for controlling swath width and placement have been devised in the past. For instance, commonly assigned U.S. Pat. No. 4,225,226 issued to Davidson et al discloses a laser guidance system for crop spraying aircraft. The crop spraying aircraft carries a rotating laser transmitter and receiver to transmit a laser beam onto a plurality of ground reflectors located at known positions relative to each other and to detect the subsequently reflected laser beams. The angular position of the aircraft is then determined by a microprocessor based on the reflected laser beams. Any deviation from a predetermined spraying path results in a microprocessor-generated error signal.

Other methods for controlling swath width and Location include using ground personnel holding flags at either end of the field to provide visual guidance to the aircraft pilot and dropping materials on the field from a dispenser mounted on the aircraft to provide a visual ground reference for the aircraft pilot on the next traverse. Numerous problems exist with the above described methods. The high chemical concentrations used by modern crop spraying aircraft, which allow such aircraft to cover larger areas with a given payload, have increased the health hazards associated with using ground personnel in close proximity to the chemical spraying. Further, overlapping of these higher concentration chemicals can damage or destroy crops to a greater degree.

Additional problems with previous systems involve the requirement of adjacent traverses and the manual operation of the chemical spraying device. To make sequential, adjacent traverses of a field, the pilot is required to execute a key-hole turn at the end of each pass. A key-hole turn consists, for example, of a 45 degree left turn, a 270 degree right turn and another 45 degree left turn in succession. The short radius turns and sharp turning angles required in previous methods significantly increase the possibility of aircraft aerodynamic stall.

Prior chemical spraying systems also require that the aircraft pilot identify the proper time to release the chemicals at the beginning of the swath and the proper time to shut off the spraying device at the end of the swath. Typically, these judgments are made based on visual perception of the aircraft pilot. Failure to turn the spraying device on or off correctly results in unsprayed crops or overspraying into neighboring land.

Accordingly, the need exists in the art for an improved control system and method for applying chemicals to an agricultural field by aircraft which dynamically detects position changes of the aircraft, automatically activates and deactivates the chemical spraying at the beginning and ending boundaries of the field, permits increases in the radius turn and turning angle of the flight paths, provides more accurate swath path control, allows alteration of the directional orientation of the swaths for optimal spraying coverage, and provides increased swath control to ensure uniform chemical coverage throughout the field.

SUMMARY OF THE INVENTION

The aforementioned need is met by the aircraft control system and method for applying chemicals to an agricultural field in one of a plurality of flight patterns in accordance with the present invention. The control system includes a global positioning system receiver for continuously determining aircraft position and a computer for automatically activating and deactivating the chemical spraying system of the aircraft when the aircraft traverses the field in the desired flight pattern.

In accordance with one aspect of the present invention, a aircraft control system for use in an agricultural aircraft for applying chemicals to an agricultural field in one of a plurality of flight patterns, such as an oval pattern and a keyhole pattern, comprises a global positioning receiver means for receiving radio frequency signals from a plurality of satellites. A computer means, responsive to the global positioning receiver means, stores the surface coordinates of the boundary of the agricultural field and the one of the plurality of flight patterns. The radio frequency signals are decoded by the computer means to determine continuously the position of the aircraft. The actual position of the aircraft is then compared to the desired flight pattern. In addition, the computer means automatically activates at least one dispenser valve, contained in the aircraft, when the aircraft is flying within the boundary of the agricultural field whereby the chemicals are applied to the agricultural field. Preferably, the computer means also includes means for recording aircraft flight data during an application of the chemicals to the agricultural field.

A pilot interface means, responsive to the computer means, indicates deviations in position of the aircraft from the one of the plurality of flight patterns to a pilot of the aircraft. Preferably, the pilot interface means comprises an audible signal means for transmitting an audible signal representative of amount and direction of deviation of the aircraft from the one of the plurality of flight patterns to the pilot of the aircraft The aircraft control system is preferably operated fin the differential mode to compensate for errors in the satellite radio frequency signals. In the differential mode, the global positioning receiver means receives a correction radio frequency signal from a stationary differential ground station representative of the aforementioned frequency fluctuations in the radio frequency signals. The computer means includes means for decoding the correction radio frequency signal and uses the decoded correction radio frequency signal to compensate for frequency fluctuations in the radio frequency signals to determine continuously the position of the aircraft.

To increase fuel and time efficiency, the computer means may include means for determining the most direct flight path from a takeoff point of the aircraft to the agricultural field based on surface position of the agricultural field and the takeoff point. The computer means preferably includes means for monitoring the level of the chemicals in the reservoir and closes the dispenser valve upon complete dispersion of the chemicals. The stop position of the aircraft when the dispenser valve is closed is then stored. The computer means then reopens the dispenser valves automatically upon refilling the reservoir and upon the aircraft resuming the one of the plurality of flight patterns and traversing the stop position.

In accordance with another embodiment of the present invention, an aircraft control system for use in an agricultural aircraft for applying chemicals to an agricultural field in one of a plurality of flight patterns having at least one dispenser valve for releasing the chemicals from a reservoir is provided. The aircraft control system comprises global positioning receiver means for receiving the radio frequency signals from a plurality of global positioning satellites and for generating position signals representative of the radio frequency signals.

A computer means, responsive to the global positioning means, stores surface coordinates of the boundary of the agricultural field, selects the one of the plurality of flight patterns of the aircraft, orients the one of the plurality of flight patterns in response to the orientation signal, decodes the position signals to determine continuously the position of the aircraft.

A pilot interface means, responsive to the computer means, indicates deviations of the aircraft from the one of the plurality of flight patterns to a pilot of the aircraft and provides an orientation signal representative of desired flight path orientation of the one of the plurality of flight patterns in response to the pilot selection such that the pilot guides the aircraft along the one of the plurality of flight patterns to apply the chemicals to the agricultural field.

Preferably, the computer means includes means for automatically activating the at least one dispenser valve when the aircraft is flying within the boundary of the agricultural field whereby the chemicals are applied to the agricultural field. The computer means may also include means for determining a sequence of paths of flights in the one of the plurality of flight patterns based on a desired swath width and a desired track width.

In accordance with yet another embodiment of the present invention a method for controlling application of chemicals to an agricultural field using an agricultural aircraft having at least one dispenser valve for containing and releasing the chemicals is provided. The method comprises the steps of: providing surface coordinates of the boundary of the agricultural field; selecting one of a plurality of flight patterns; receiving radio frequency signals from a plurality of satellites; decoding the radio frequency signals to determine continuously the position of the aircraft relative to the agricultural field and the one of the plurality of flight patterns; indicating to a pilot of the aircraft deviations in position of the aircraft from the one of the plurality of flight patterns; and automatically activating the at least one dispenser valve when the aircraft is flying within the boundary of the agricultural field whereby the chemicals are applied to the agricultural field.

Preferably, the method for controlling an agricultural aircraft further comprises the steps of: receiving correction radio frequency signals from a stationary differential ground station; decoding the correction radio frequency signals; and using the decoded correction signals to compensate for errors in the radio frequency signals to determine continuously the position of the aircraft.

The step of indicating to a pilot of the aircraft may comprise the steps of: generating an audible signal representative of amount and direction of deviation of the aircraft from the one of the plurality of flight patterns; and transmitting the audible signal to the pilot of the aircraft.

The method for controlling an agricultural aircraft preferably further comprises the steps of: providing a desired swath width and a desired track width; determining a sequence of paths of flight of the aircraft in the one of the plurality of the flight patterns based on the desired swath width and the desired track width; and indicating deviations of the aircraft from the sequence of the paths of flight to the pilot.

It is thus a feature of the present invention to provide an aircraft control system and method for applying chemicals to an agricultural field in one of a plurality of flight patterns wherein the chemicals are automatically released as the aircraft traverses the field.

Other features and advantages of the present invention will be apparent from the following description, the accompanying drawings and the appended claims.

DETAILED DESCRIPTION OF THE INVENTION

Figure 1:
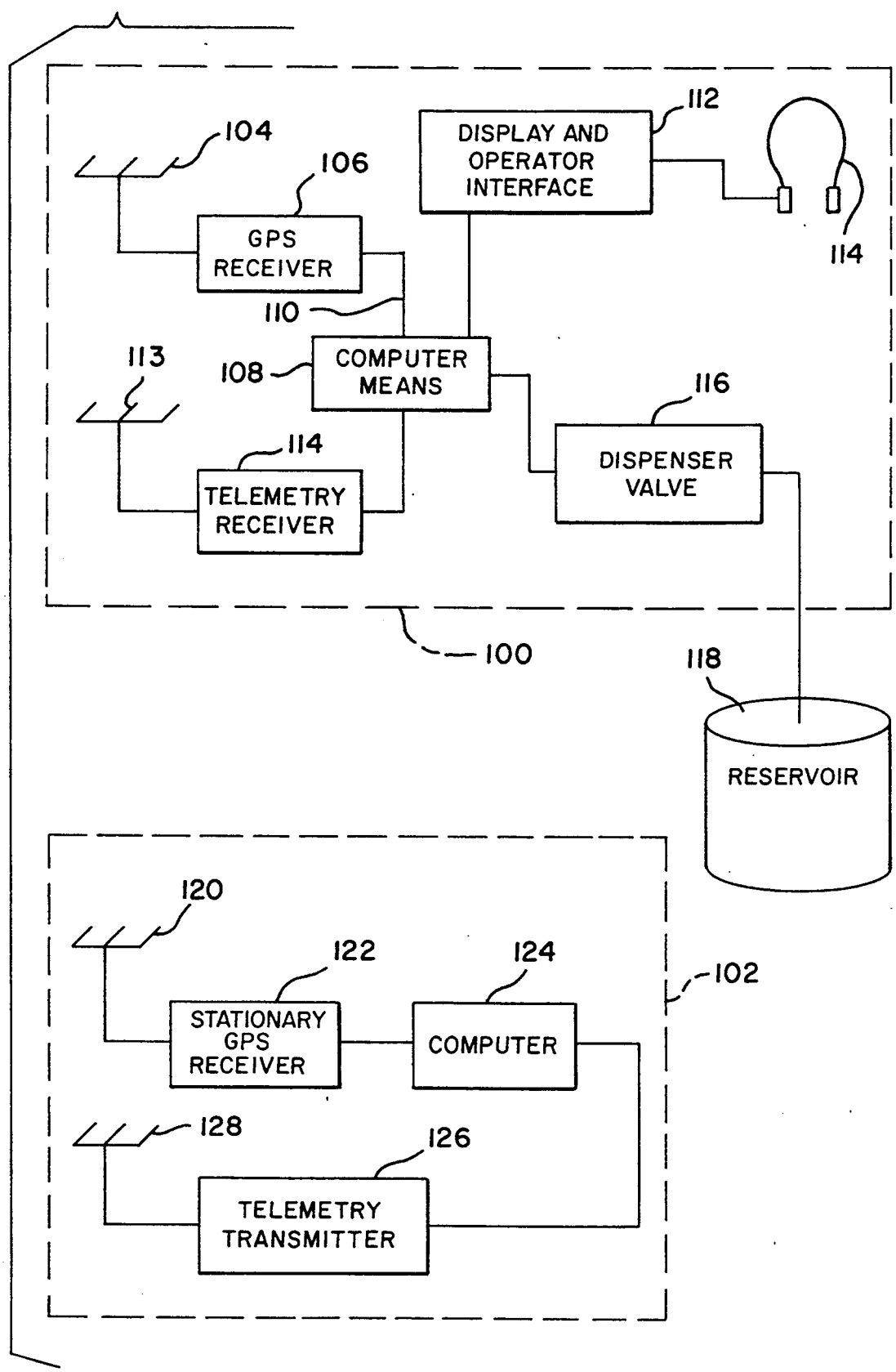
FIG. 1 is a block diagram of an aircraft control system and a stationary differential GPS ground system in accordance with the present invention.

Referring now to FIG. 1, a block diagram of an aircraft control system 100 and a differential global positioning system (GPS) ground station 102 for applying chemicals to an agricultural field in one of a plurality of flight patterns is shown in accordance with the present invention. The aircraft control system 100 includes a global positioning receiver means, which comprises satellite antenna 104 and GPS receiver 106, for receiving radio frequency signals from satellites. The satellite antenna 104 may be one of a number of well known antenna designs, such as a fixed radiation pattern antenna or an adaptive array antenna. Computer means 108 receives position signals over signal path 110 from the GPS receiver 106 indicative of the received radio frequency signals and determines the position of the aircraft from the position signals.

Based on the thus determined position of the aircraft and the surface coordinates of the field to be sprayed, which are stored in an electronic memory (not shown), the computer means 108 controls pilot interface means, comprising a display and operator interface 112 and an audio signal means, shown as headset 114, to indicate the proper flight path to the aircraft pilot. The computer means 108 also controls the operation of a dispenser valve 116 to release chemicals from a reservoir 118 when the aircraft is flying over the field in the correct flight path. The global positioning receiver means further includes a correction antenna 113 and a telemetry receiver 114 for receiving correction signals from the differential GPS ground station 102 during differential operation of the aircraft control system 100.

The process of receiving and decoding radio frequency signals from satellites to determine the position of an aircraft or other object is well known in the art. Since the structure and philosophy of the GPS receiver are not important to present invention beyond the generation of position signals, details of such receivers will not be further disclosed herein. Those desiring additional information regarding GPS receivers and the GPS system in general are referred to the NATO publication entitled "Navstar GPS User Equipment" distributed by the U.S. Coast Guard, GPS information Center which is incorporated herein by reference.

As is well known in the art, the radio frequency signals transmitted by the GPS satellites contain various pseudorandom frequency fluctuations which may be intentionally produced, such as for security purposes, or are caused by ionospheric interference. The differential GPS ground station 102 is used to detect and compensate for these fluctuations. Since the operation of differential GPS systems is well known in the art and is extensively discussed in the aforementioned NATO publication, only a general description of the operation of the ground station 102 will now be given.

The differential GPS ground station 102 is operated at a previously surveyed location. A stationary satellite antenna 120 receives radio frequency signals from GPS satellites and a stationary GPS receiver 122, similar no the GPS receiver 106, conditions the received radio frequency signals for input into a computer 124. The computer 124 then determines the position of the ground station 102 based on the received radio frequency signals. This determined position of the ground station 102 is compared to the surveyed position of the ground station 102 and a correction signal is generated indicative of this comparison. In response to the correction signal, a telemetry transmitter 126 transmits a correction radio frequency signal via a differential antenna 128.

The correction radio frequency signal is received by the correction antenna 113 and conditioned by the telemetry receiver 114 for proper receipt by the computer means 108. The computer means 108 uses the correction signal to compensate for frequency fluctuations in the radio frequency signals transmitted by the GPS satellites.

Figure 3:
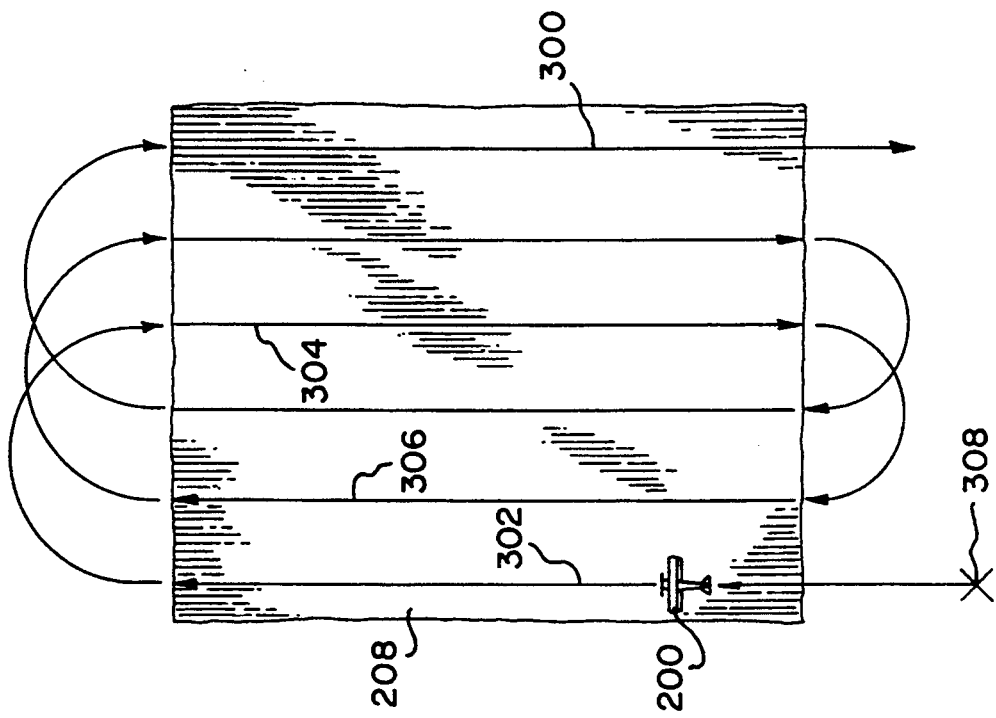
FIG. 3 is a top view of an aircraft flying over a field in an oval flight path pattern.
Figure 2:
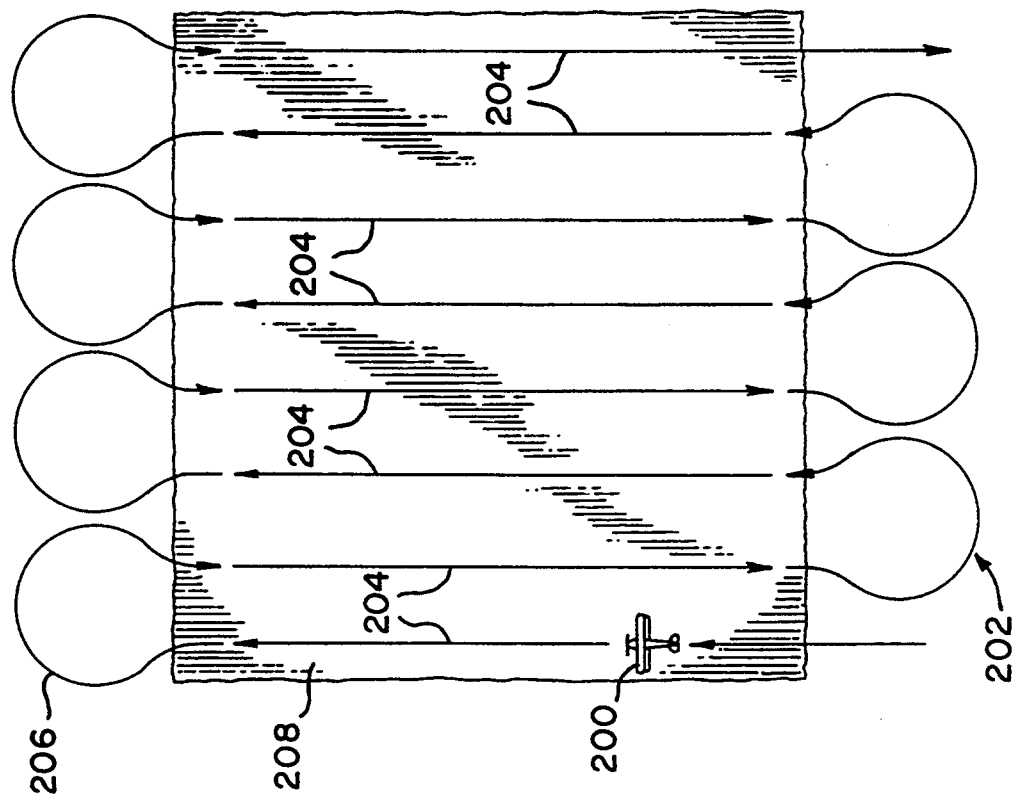
FIG. 2 is a top view of an aircraft flying over a field in a keyhole flight path pattern.
Figure 4:
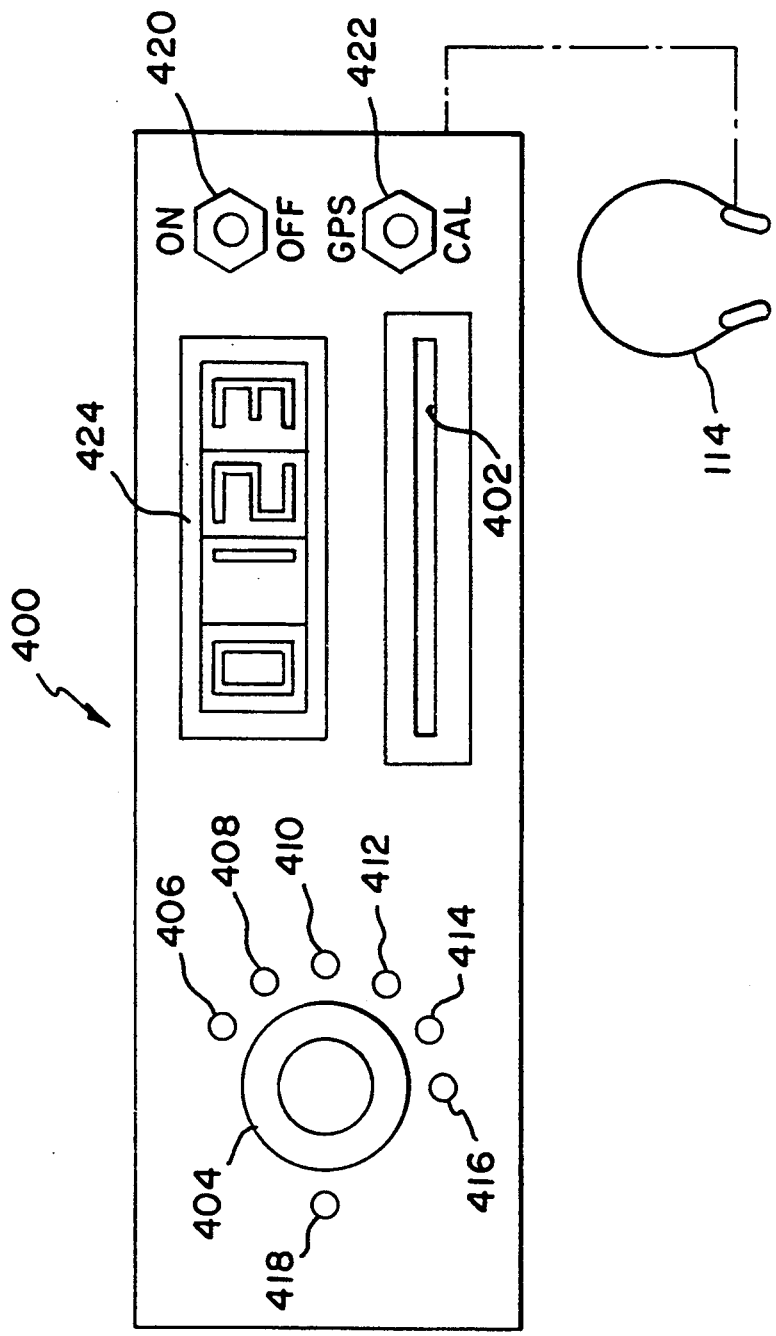
FIG. 4 shows an exemplary pilot interface system including a pilot interface panel, a control stick switch and a pilot headset in accordance with the present invention.

The operation of the present invention will now be described in detail with reference to FIGS. 2 through 4. Initially, the agricultural field to be sprayed, shown at 208 in FIGS. 2 and 3, is premapped by driving a GPS receiver equipped vehicle around the perimeter of the field. During the traverse of the perimeter, the surface coordinates of the field are detected and translated into an appropriate coordinate system. These coordinates are then stored in storage device, such as a computer. The coordinates are then downloaded into the computer means 108 of the aircraft prior to a spraying operation. It should be appreciated that the coordinates of more than one field may be downloaded into the computer means 108. Thereafter, the aircraft pilot accesses the coordinates of a particular field before spraying.

In addition, the computer means 108 stores a plurality of flight patterns in which the airplane may traverse the field. FIG. 2 shows an aircraft 200 executing a key-hole turn flight pattern 202 having successively adjacent swaths or flight paths 204 over the field 208. The aircraft 200 executes a turn 206 at the end of each swath 204 so as to traverse the field 208 in an adjacent swath 204. An oval or race track flight pattern 300 is illustrated in FIG. 3 having first, second and third flight paths 302, 304 and 306.

Once the coordinates of the field 208 to be sprayed has been selected, the computer means 108 determines the most direct flight path from the takeoff point 308 of the aircraft 200 to the field 208 based on the surface position of the field 208. Upon reaching the field 208, the pilot determines the desired orientation of the swaths. The pilot determines this orientation based on a number of factors including wind, obstructions and approach angle. After determining the appropriate swath orientation, the pilot enters the selected orientation into the computer means 108 via an appropriate input device. The pilot also enters the desired swath width and track width (width of the oval pattern). The pilot interface means provides an orientation signal representative of the desired flight path orientation to the computer means 108 in response to the pilot selection. The computer means 108 then orients the flight pattern in accordance with the orientation signal.

Based on the aforesaid information, the computer means 108 automatically determines the sequential paths of flight of the aircraft over the field 208 based on the orientation of the flight pattern, the desired swath width and the desired track width. Since the oval flight pattern allows larger turning radiuses and lesser turning angles, thereby reducing the risk of aircraft aerodynamic stall, the flight paths will usually be in oval configurations, as shown in FIG. 3. As the aircraft 200 traverses the field 208, an audible signal representative of amount and direction of deviation of the aircraft from the flight pattern is continually given to the pilot via headset 114.

When the aircraft is following the desired flight path, no audio signal is produced. An audio tone of increasing frequency is produced as the amount of deviation from the desired path increases. The direction of deviation from the desired path is communicated to the pilot through the use of a continuous tone for one direction and a pulsed tone for the other direction. Consequently, the audible signal indicates both amount and direction of deviation to the pilot. By providing steering information in audio format, the pilot can guide the aircraft without impairing the vision and seat-of-the-pants senses. The steering information may also be presented to the pilot using a conventional heads up display. The heads up display presents the information on the windshield of the aircraft to provide visual instructions to the pilot.

On approach to the field 208, the pilot guides the aircraft 200 using the above described audio signal. As the aircraft crosses one boundary of the field 208, the computer means 108 automatically releases the chemicals via the dispenser valve 116 and the reservoir 118. At the end of a swath, such as first swath 302 of FIG. 3, the aircraft 200 crosses the opposite boundary and the computer means 108 automatically turns off the sprayer system. As will be readily comprehended by those skilled in the art, the spraying procedure may alternatively be operated manually by the pilot based on visual perception as is well known in the art.

After completing the first swath 302, the pilot indicates to the computer means 108 that a second swath 304 in the opposite direction is commencing. Alternatively, the computer means 108 may be programmed to automatically commence the second swath 304. For example, the computer means 108 may be programmed to commence the next swath whenever the aircraft experiences a 90 degree deviation from the preceding swath direction. Thus, the computer means 108 would automatically detect when the aircraft is turning to proceed with a new swath.

Upon completion of the second swath 304, a third swath 306 is identified adjacent to the first swath 302 and spaced at the appropriate swath width. The computer means 108 records the aircraft flight data, including direction, speed and altitude, for the spraying operation. The spraying operation is executed in this manner until the field is completely sprayed or the chemicals are exhausted.

In the latter case, the position of the aircraft when the chemicals are exhausted is stored and, upon returning with additional chemicals, the flight path is recalled. As the aircraft 200 approaches the point of the prior chemical cut-off, the chemicals are automatically released and the spraying is continued substantially without overspray or a gap in coverage.

Pilot interface 400 will now be described with reference to FIG. 4. A slot 402 accepts a digitally encoded magnetic card (not shown for ease of illustration) to download field data into the computer means 108 of the aircraft. A switch assembly is provided comprising an outer rotary switch 404 and a concentric inner rotary switch. Around the periphery of the outer rotary switch 404 is located a set of laser diode indicator lights. Each of the respective indicator lights has an associated function including field identification 406, navigate 408, swath width 410, swath course 412, track width 414, recover last pass 416 and auto spray 418.

After loading the chemicals into the reservoir 118 of the aircraft 200, the control system is activated via on/-off switch 420. After downloading and saving the data for the particular field to be sprayed by inserting the magnetic card into the slot 402, the aircraft 200 is taxied over a predetermined calibration point and the GPS receiver is calibrated into a predetermined coordinate system via calibration switch 422.

Each field has an unique, four digit identification number which is entered into memory during downloading. The four digit identification number may be visually presented on a display 424 by selecting the field ID position 406 of the outer rotary switch 404. The most direct route to the field is communicated to the pilot via an audible signal when the outer rotary switch 404 is rotated to the navigate position 408. When the aircraft is approaching the field, the swath width 410, the swath course 412 (or orientation of the flight pattern) and the track width 414 (width of the oval) is entered by the pilot via the appropriate rotary switch 404 selection. Lastly, the auto spray function 418 is activated to permit the computer means 108 to automatically release the chemicals over the field 208.

If a prior load of chemicals has been dispensed and the field is not completely covered, the recover last pass function 416 allows the pilot to being spraying at the depletion point after refilling the reservoir 118. The computer means 108 monitors the level of the chemicals in the reservoir 118 and closes the dispenser valve 116 upon complete dispersion of the chemicals. The computer means 108 then stores the stop position of the aircraft when the dispenser valve is closed (and the chemicals are completely dispersed) and reopens the dispenser valve upon the aircraft resuming the flight pattern and traversing the stop position.

Having thus described the aircraft control apparatus and method for applying chemicals to an agricultural field in accordance with the present invention in detail by way of reference to preferred embodiments thereof, it will be apparent that other modifications and variations are possible without departing from the scope of the invention defined in the appended claims.

What is claimed is:

1. An aircraft control system for use in an agricultural aircraft for applying chemicals to an agricultural field in one of a plurality of flight patterns, said aircraft having at least one dispenser valve for releasing said chemicals from a reservoir, said aircraft control system comprising:

global positioning receiver means for receiving radio frequency signals from a plurality of satellites;

computer means, responsive to said global positioning means, for storing surface coordinates of the boundary of said agricultural field, for storing said one of said plurality of flight patterns, for decoding said radio frequency signals to determine continuously the position of said aircraft, for determining deviations in position of said aircraft from said one of said plurality of flight patterns, and for automatically activating said at least one dispenser valve when said aircraft is flying within the boundary of said agricultural field whereby said chemicals are applied to said agricultural field; and pilot interface means, responsive to said computer means, for indicating deviations in position of said aircraft from said one of said plurality of flight patterns to a pilot of said aircraft.

2. The aircraft control system as recited in claim 1 further comprising a stationary ground station for receiving said radio frequency signals from said plurality of satellites and transmitting a correction radio frequency signal, and wherein said global positioning receiver means receives said correction radio frequency signal from said stationary differential ground station, and said computer means includes means for decoding said correction radio frequency signal and uses said correction radio frequency signal to compensate for frequency fluctuations in said radio frequency signals to determine continuously said position of said aircraft.

3. The aircraft control system as recited in claim i wherein said pilot interface means comprises an audible signal means for transmitting an audible signal to said pilot of said aircraft, said audible signal being representative of the amount and direction of deviation of said aircraft from said one of said plurality of flight patterns.

4. The aircraft control system as recited in claim 1 wherein said plurality of flight patterns comprise an oval pattern and a keyhole pattern.

5. The aircraft control system as recited in claim 1 wherein said computer means includes means for recording aircraft flight data during an application of said chemicals to said agricultural field.

6. The aircraft control system as recited in claim 1 wherein said computer means includes means for determining the most direct flight path from a takeoff point of said aircraft to said agricultural field based on surface position of said agricultural field and said takeoff point.

7. The aircraft control system as recited in claim 1 wherein said computer means includes means for monitoring the level of said chemicals in said reservoir, closing said dispenser valve upon complete dispersion of said chemicals, storing a stop position of said aircraft when said dispenser valve is closed, and reopening said dispenser valves automatically upon refilling said reservoir and upon said aircraft resuming said one of said plurality of flight patterns and traversing said stop position.

8. An aircraft control system for use in an agricultural aircraft for applying chemicals to an agricultural field in one of a plurality of flight patterns, said aircraft having at least one dispenser valve for releasing said chemicals from a reservoir, said aircraft control system comprising:

global positioning receiver means for receiving said radio frequency signals from a plurality of global positioning satellites and for generating position signals representative of said radio frequency signals;

computer means, responsive to said global positioning receiver means, for storing surface coordinates of the boundary of said agricultural field, for selecting said one of said plurality of flight patterns of said aircraft, for orienting said one of said plurality of flight patterns in response to said orientation signal, and for decoding said position signals to determine continuously the position of said aircraft, said computer means including means for automatically activating said at least one dispenser valve when said aircraft is flying within the boundary of said agricultural field whereby said chemicals are applied to said agricultural field; and pilot interface means, responsive to said computer means, for indicating deviations of said aircraft from said one of said plurality of flight patterns to a pilot of said aircraft and for providing an orientation signal representative of desired flight path orientation of said one of said plurality of flight patterns in response to said pilot selection such that said pilot guides said aircraft along said one of said plurality of flight patterns to apply said chemicals to said agricultural field.

9. The aircraft control system as recited in claim 8 further comprising a stationary differential ground station for receiving said radio frequency signals from said plurality of satellites and transmitting a correction radio frequency signal, and wherein said global positioning receiver means receives said correction radio frequency signal from said stationary differential ground station and generates a correction signal representative of said correction radio frequency signal, and said computer means includes means for decoding said correction signal and uses said correction signal to compensate for frequency fluctuations in said radio frequency signals to continuously determine said position of said aircraft.

10. The aircraft control system as recited in claim 8 wherein said pilot interface means comprises an audible signal means for transmitting an audible signal to said pilot of said aircraft, said audible signal being representative of the amount and direction of deviation of said aircraft from said flight pattern to said pilot of said aircraft.

11. The aircraft control system as recited in claim 8 wherein said computer means includes means for determining a most direct flight path from a takeoff point of said aircraft to said agricultural field based on locations of said takeoff point and agricultural field.

12. The aircraft control system as recited in claim 8 wherein said computer means includes means for determining a sequence of paths of flights in said one of said plurality of flight patterns based on a desired swath width and a desired track width.

13. The aircraft control system as recited in claim 8 wherein said plurality of flight patterns comprise an oval pattern and a keyhole pattern.

14. A method for controlling application of chemicals to an agricultural field using an agricultural aircraft, said aircraft having at least one dispenser valve for containing and releasing said chemicals, said method comprising the steps of:

providing surface coordinates of the boundary of said agricultural field;

selecting one of a plurality of flight patterns;

receiving radio frequency signals from a plurality of satellites;

decoding said radio frequency signals to determine continuously the position of said aircraft relative to said agricultural field and said one of said plurality of flight patterns;

indicating to a pilot of said aircraft deviations in position of said aircraft from said one of said plurality of flight patterns; and automatically activating said at least one dispenser valve when said aircraft is flying within the boundary of said agricultural field whereby said chemicals are applied to said agricultural field.

15. The method for controlling an agricultural aircraft as recited in claim 14 further comprising the steps of:

receiving correction radio frequency signals from a stationary differential ground station;

decoding said correction radio frequency signals; and using said decoded correction signals to compensate for frequency fluctuations in said radio frequency signals to determine continuously said position of said aircraft.

16. The method for controlling an agricultural aircraft as recited in claim 14 wherein said step of indicating to an pilot of said aircraft comprises the steps of:

generating an audible signal representative of amount and direction of deviation of said aircraft from said one of said plurality of flight patterns; and transmitting said audible signal to said pilot of said aircraft.

17. The method for controlling an agricultural aircraft as recited in claim 15 wherein said step of selecting one of a plurality of flight patterns comprises the step of selecting one of a keyhole flight pattern and an oval flight pattern.

18. The method for controlling an agricultural aircraft as recited in claim 14 further comprising the step of determining a most direct flight path from a takeoff point of said aircraft to said agricultural field based on location of said takeoff point and location of said agricultural field.

19. The method for controlling an agricultural aircraft as recited in claim 14 further comprising the steps of:

providing a desired swath width and a desired track width;

determining a sequence of paths of flight of said aircraft in said one of said plurality of said flight patterns based on said desired swath width and said desired track width; and indicating deviations of said aircraft from said sequence of said paths of flight to said pilot.

* * * * *